(12) United States Patent
Zha et al.

(10) Patent No.: US 11,059,992 B2
(45) Date of Patent: Jul. 13, 2021

(54) WATERBORNE POLYURETHANE COATINGS

(71) Applicant: SUN CHEMICAL CORPORATION, Parsippany, NJ (US)

(72) Inventors: Yongping Zha, Berkeley Heights, NJ (US); Philippe Schottland, Sparta, NJ (US); Robert Mateuszczyk, Hopelawn, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 15 days.

(21) Appl. No.: 16/478,177

(22) PCT Filed: Jan. 17, 2018

(86) PCT No.: PCT/US2018/014007
§ 371 (c)(1),
(2) Date: Jul. 16, 2019

(87) PCT Pub. No.: WO2018/136488
PCT Pub. Date: Jul. 26, 2018

(65) Prior Publication Data
US 2019/0367769 A1 Dec. 5, 2019

Related U.S. Application Data

(60) Provisional application No. 62/448,031, filed on Jan. 19, 2017.

(51) Int. Cl.
| | |
|---|---|
| *C09D 175/04* | (2006.01) |
| *B05D 3/10* | (2006.01) |
| *C08G 18/44* | (2006.01) |
| *C08G 18/48* | (2006.01) |
| *C08G 18/72* | (2006.01) |
| *C08G 18/73* | (2006.01) |
| *C08G 18/75* | (2006.01) |
| *C08G 18/79* | (2006.01) |
| *C08G 18/80* | (2006.01) |
| *C03C 17/00* | (2006.01) |
| *C03C 17/32* | (2006.01) |
| *C08G 18/76* | (2006.01) |
| *C08G 18/08* | (2006.01) |
| *C08G 18/42* | (2006.01) |

(52) U.S. Cl.
CPC ........... *C09D 175/04* (2013.01); *B05D 3/108* (2013.01); *C03C 17/005* (2013.01); *C03C 17/007* (2013.01); *C03C 17/322* (2013.01); *C08G 18/0823* (2013.01); *C08G 18/42* (2013.01); *C08G 18/44* (2013.01); *C08G 18/48* (2013.01); *C08G 18/722* (2013.01); *C08G 18/73* (2013.01); *C08G 18/755* (2013.01); *C08G 18/7621* (2013.01); *C08G 18/797* (2013.01); *C08G 18/80* (2013.01); *B05D 2503/00* (2013.01); *C03C 2217/477* (2013.01); *C03C 2217/485* (2013.01)

(58) Field of Classification Search
CPC ...... C09D 175/04; C08G 18/44; C08G 18/48; C08G 18/722; C08G 18/73; C08G 18/755; C08G 18/797; C08G 18/80; C08G 18/7621; C08G 18/0823; C08G 18/1842; C03C 17/007; C03C 17/322; C03C 17/005; C03C 2217/477; C03C 2217/485; B05D 3/108; B05D 2503/00
See application file for complete search history.

(56) References Cited

U.S. PATENT DOCUMENTS

| | | | |
|---|---|---|---|
| 4,066,591 A * | 1/1978 | Scriven ............ | C08G 18/0804 204/489 |
| 4,163,814 A | 8/1979 | Asai et al. | |
| 4,280,944 A | 7/1981 | Saito et al. | |
| 4,762,751 A | 8/1988 | Girgis et al. | |
| 5,670,600 A | 9/1997 | Nienhaus et al. | |
| 5,852,106 A | 12/1998 | Wilmes et al. | |
| 6,414,079 B1 | 7/2002 | Schafheutle | |
| 6,555,231 B2 | 4/2003 | Doty et al. | |
| 8,343,601 B1 | 1/2013 | Ekin et al. | |
| 2003/0012959 A1 | 1/2003 | Doty et al. | |
| 2006/0141264 A1 | 6/2006 | Rearick | |
| 2012/0201982 A1 | 8/2012 | Stewart et al. | |
| 2013/0011590 A1 | 1/2013 | Subramanian et al. | |

FOREIGN PATENT DOCUMENTS

| | | |
|---|---|---|
| EP | 0 519 074 | 12/1992 |
| WO | WO 2013/006605 | 6/2006 |

OTHER PUBLICATIONS

Odian, George, Principles of Polymerization, Third Edition, John Wiley & Sons, Inc., 1991, pp. 19-24.*
Supplementary EPSR issued in counterpart EP application No. 18 74 1691 issued Aug. 25, 2020.
International Search Report issued in International Application No. PCT/US18/014007, dated Mar. 29, 2018.
Written Opinion of the International Searching Authority issued in International Application No. PCT/US18/014007, dated Mar. 29, 2018.

(Continued)

*Primary Examiner* — Patrick D Niland
(74) *Attorney, Agent, or Firm* — Marian E. Fundytus; Ostrolenk Faber LLP.

(57) ABSTRACT

The present invention provides waterborne polyurethane coating compositions. When applied to a substrate, the coating compositions of the present invention have good adhesion, transparency, scratch resistance, mar resistance, hardness, solvent resistance, water resistance, and dishwashing resistance. The coating compositions are suitable for application to any suitable substrate, including glass.

21 Claims, No Drawings

(56) References Cited

OTHER PUBLICATIONS

International Preliminary Examination Report issued in International Application No. PCT/US18/014007, dated May 29, 2019.
Martin, L. et. al. Waterborne polyurethane resins for glass coatings. PCI Magazine (Jul. 24, 2000).
Barletta, M. et. al. Coating of glass and polycarbonate with aqueous two-component polyurethane resin. J. Appl. Polym. Sci., 131(6), DOI: 10.1002/APP.40021 (2014).
CL Office Action issued in counterpart CL application No. 201901870 dated Jun. 11, 2020 with English language translation thereof.

* cited by examiner

WATERBORNE POLYURETHANE COATINGS

CROSS REFERENCE TO RELATED APPLICATIONS

The present application is a § 371 National Phase application based on PCT/US18/14007 filed Jan. 17, 2018, which claims the benefit of U.S. Provisional Application No. 62/448,031, filed Jan. 19, 2017, the subject matter of each of which is incorporated by reference in their entirety.

FIELD OF THE INVENTION

The present invention is related to waterborne polyurethane coating compositions. The compositions can be provided as stable one-component coating systems. When applied to a substrate, the coating compositions of the present invention have good adhesion, transparency, scratch resistance, mar resistance, hardness, water resistance, and dishwashing resistance. The coating compositions are suitable for application to any suitable substrate, including glass.

BACKGROUND

Polyurethanes are widely used as surface overlay coatings on a wide variety of substrates because of their combination of desirable properties. For example, polyurethane coatings are flexible, tough, have good water and chemical resistance, and have improved clarity compared to other types of coatings. Polyurethane coatings are particularly useful for providing a coating to glass surfaces for decorative and protective purposes. Glass articles, such as bottles for beverages, are subjected to many environmental challenges, such as rubbing, exposure to chemicals, exposure to harsh washing conditions, etc. Thus, coatings for glass articles must have good abrasion resistance, scratch resistance, mar resistance, solvent resistance, water resistance, and detergent resistance, depending on the final applications of the glassware.

Due to the increased restriction on volatile organic compounds (VOCs) in coatings, solvent-free systems which may be supplied as a single component are advantageous as an environmentally friendly alternative. One-component coating compositions comprise pre-mixed materials that have acceptable pot life and storage stability, and are cured under specific conditions (e.g. hydroxyl-functional resins cross-linked with alkoxylated aminoplast resins or reversibly blocked isocyanates) when applied to substrates. In contrast, multi-component coating compositions comprise two or more separate and mutually reactive components that are mixed immediately prior to application to a substrate. The separate components respectively contain ingredients that are reactive under ambient conditions and that begin appreciable formation of cured resin immediately upon mixing. Therefore, the multi-components must remain separated until immediately before application, because pot life is limited due to the immediate reaction and gelling upon mixing (i.e. limited pot life).

One- and two-component polyurethane coatings are generally described in Martin, L. et. al. Waterborne polyurethane resins for glass coatings. *PCI Magazine* (Jul. 24, 2000) and Barletta, M. et. al. Coating of glass and polycarbonate with aqueous two-component polyurethane resin. *J. Appl. Polym Sci.*, 131(6), DOI: 10.1002/APP.40021 (2014).

EP 0 519 074 describes an aqueous glass coating composition that is applied in two coats, wherein the topcoat contains three main components: an aqueous polyurethane dispersion, an aqueous epoxy resin, and an aqueous melamine resin. The coating system is a multi-component system.

U.S. Pat. Nos. 4,163,814 and 4,280,944 disclose aqueous polyether-based polyurethane dispersions containing free hydroxyl groups and blocked isocyanate groups, which constitute a one-component system, and can be thermally cured. However, the coatings have inadequate pencil hardness, and do not exhibit good adhesion to glass and resistance to alkali.

U.S. Pat. No. 5,852,106 describes aqueous polyurethane coating compositions wherein the binder contains a polyol component and a polyisocyanate component with blocked isocyanate groups. While the coatings demonstrate good alkali resistance, it is generally necessary to add melamine to such compositions to increase toughness or hardness for some applications.

US 2012/0201982 discloses one-component thermally-curable aqueous polyurethane coating compositions comprising a hydroxyl-functional polyurethane dispersion, a blocked polyisocyanate, and a polycarbonate-polyurethane resin, wherein the polycarbonate-polyurethane resin is non-functional. Addition of the non-functional polycarbonate-polyurethane resin provides improved flexibility, without any loss in adhesion or toughness.

US 2013/0011590 discloses one-component thermally-curable aqueous polyurethane coating compositions comprising a hydroxyl-functional polyurethane resin, an aminoplast, and a polycarbonate-polyurethane. The polycarbonate-polyurethane resin is non-functional.

U.S. Pat. No. 8,343,601 discloses aqueous polyurethane coating compositions comprising a polyol resin (e.g. acrylic resin), an aminoplast, and a polycarbonate-polyurethane resin. The polycarbonate-polyurethane is non-functional.

U.S. Pat. No. 6,555,231 describes an acrylic-free, waterborne coating composition comprising a polyurethane dispersion with at least one carboxyl group, and a water-soluble cross-linker (such as melamine). The coating composition provides a paint film having improved chip resistance when applied to a substrate.

While the compositions of the prior art have provided aqueous coating compositions which are suitable for glass surfaces exhibiting good abrasion, high impact, water, and alkali resistance, such prior art coatings are generally soft, and exhibit decreased hardness when compared to an uncoated glass surface. The decreased hardness is undesirable by end users. Moreover, they all require at least 1% coalescing agent, such as dipropylene glycol, in the formulations, and are thus not truly solvent-free. Thus, there is still a need for aqueous polyurethane coatings that exhibit increased hardness, as well as the improved resistance properties, and that are truly solvent-free.

BRIEF SUMMARY OF THE INVENTION

The present invention provides waterborne polyurethane coating compositions that exhibit improved transparency and hardness, as well as improved abrasion, high impact, water, solvent, and alkali resistance.

In a particular aspect, the present invention provides a coating composition comprising:

a) a water dilutable carboxyl, or hydroxyl, or carboxyl and hydroxyl, functional polyurethane dispersion, in an amount of 1 wt % to 99 wt %, based on the total weight of the coating composition; and b) one or more cross-linking agents, in an amount of 1 wt % to 99 wt %, based on the total weight of the coating composition;

wherein the one or more cross-linking agents are selected from the group consisting of carbodiimides, carbodiimide derivatives, aminoplasts, blocked isocyanates, and combinations thereof;

wherein the polyurethane has a glass transition temperature of −40° C. to 50° C.; and wherein the polyurethane has an elongation at break of 10% to 250%.

In one embodiment, at least one cross-linker is a carbodiimide.

In another aspect, the present invention provides a method of applying a coating composition on a substrate, comprising:

a) providing the coating composition of the present invention;

b) applying the coating composition to the substrate; and c) drying and/or curing the coating composition on the substrate.

In another aspect, the present invention provides a method of formulating a coating composition, comprising mixing:

a) a water dilutable carboxyl, or hydroxyl, or carboxyl and hydroxyl, functional polyurethane dispersion, in an amount of 1 wt % to 99 wt %, based on the total weight of the coating composition; and b) one or more cross-linking agents, in an amount of 1 wt % to 99 wt %, based on the total weight of the coating composition;

wherein the one or more cross-linking agents are selected from the group consisting of carbodiimides, carbodiimide derivatives, aminoplasts, blocked isocyanates, and combinations thereof;

wherein the polyurethane has a glass transition temperature of −40° C. to 50° C.; and wherein the polyurethane has an elongation at break of 10% to 250%.

In certain embodiments, the present invention provides substrates and articles comprising the coating compositions of the present invention.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides coating compositions which are suitable for various substrates, including glass, and which have high pencil hardness, in addition to outstanding optical properties, good adhesion to the substrate, increased abrasion resistance, scratch resistance, mar resistance, solvent resistance, water resistance, detergent (alkali) resistance, and overprintability.

In a particular aspect, the present invention provides a coating composition comprising:

a) a water dilutable carboxyl, or hydroxyl, or carboxyl and hydroxyl, functional polyurethane dispersion, in an amount of 1 wt % to 99 wt %, based on the total weight of the coating composition; and b) one or more cross-linking agents, in an amount of 1 wt % to 99 wt %, based on the total weight of the coating composition;

wherein the one or more cross-linking agents are selected from the group consisting of carbodiimides, carbodiimide derivatives, aminoplasts, blocked isocyanates, and combinations thereof;

wherein the polyurethane has a glass transition temperature of −40° C. to 50° C.; and wherein the polyurethane has an elongation at break of 10% to 250%.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein "article" or "articles" means a substrate or product of manufacture. Examples of articles include, but are not limited to: substrates such as paper, fabric, leather, textiles, felt, concrete, masonry, stone, plastic, plastic or polymer film, glass, ceramic, metal, wood, composites, and the like; and products of manufacture such as publications (e.g. brochures), labels, and packaging materials (e.g. cardboard sheet or corrugated board), containers (e.g. bottles, cans), clothing, a polyolefin (e.g. polyethylene or polypropylene), a polyester (e.g. polyethylene terephthalate), a metalized foil (e.g. laminated aluminum foil), metalized polyester, a metal container, and the like.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, a "carboxyl" functional polyurethane or polyurethane dispersion is a polyurethane having one or more reactive carboxyl (COOH) groups.

As used herein, a "hydroxyl" functional polyurethane or polyurethane dispersion is a polyurethane having one or more reactive hydroxyl (OH) groups.

As used herein, a "carboxyl and hydroxyl" functional polyurethane or polyurethane dispersion is a polyurethane having one or more reactive carboxyl groups and one or more reactive hydroxyl groups.

As used herein, the term "polyisocyanate" refers to a compound having two or more unreacted isocyanate groups.

As used herein, the term "water-dilutable" refers to solubility as a molecular solution in water, or dispersability as a dispersion, emulsion, suspension, colloid, and the like, in water, with or without external dispersants, emulsifiers, surfactants, co-solvents, or the like.

As used herein, the term "aminoplast resin" refers to resins based on urea-formaldehyde or melamine-formaldehyde condensation products.

As used herein, "elongation," "percent elongation," "% elongation," or "elongation (%)" is a measure that refers to the amount that a material is elongated or stretched until it breaks, relative to the initial length of the material. For example, if the sample is originally 100 mm, and can be stretched to 120 mm, then the elongation is 20%.

As used herein, the terms "coating composition(s)," "composition(s)," "coating(s)," "formulation(s)," and the like, when referring to the compositions of the present invention are used interchangeably, and are intended to refer to the compositions of the present invention.

Coating Compositions

The present invention provides aqueous polyurethane compositions which, when applied to substrates and cured, provide the coated article with decorative and/or protective features. The coating compositions of the present invention may provide design freedom to manufacture transparent, pigmented, high gloss, matte, opaque, and frosted looks on various substrates. A vast range of colors may be selected. Dyes, pigments, etc., exhibiting the selected colors may be included in the coating compositions, allowing the glass or other substrate to take on a wide range of color finishes. Color selection may be made by a customer, substrate supplier, and/or manufacturer to provide a desired custom color finish. Industry standard colors may also be added to the coatings. Further, the coatings impart superior chemical and mechanical resistance to the coated substrates.

The coating compositions of the present invention do not require any coalescing agent. The coating compositions contain zero-to-low VOCs, and allow water to replace the currently used organic solvents as cleaning liquid. VOCs, if any, derive from the trace amounts arising from the production of the raw materials of the composition. Unlike the coating compositions in US 2012/0201982, which still require the presence of 1% to 2% glycol, the present invention can be free of solvent. As a result, water can be used for cleaning. This further reduces the impact on the environment.

The following is a non-exhaustive list, intended to be merely exemplary, of substrates and articles that may be coated with the coating compositions described herein: glass articles, such as containers, windows, and mirrors; glass particles, for example glass flakes, which include, but are not limited to, platy transparent glass or mica particles further comprising one or more inorganic layers, such as oxide layers including titania ($TiO_2$), silica ($SiO_2$), iron oxide, or combinations thereof; photonic pigments; ceramics; and metals.

One of the advantages that a coating composition of the present invention offers to those in the glass industry is that glass products can be produced clear and colorless, with color being added as needed by application of the present coatings to meet current demand. Further, from the perspective of the recycling industry, the need to sort based on color is greatly reduced, if not eliminated. The coating compositions can be burned off the glass before the glass reaches its melting temperature. Thus, recyclers would only have clear glass to process, as opposed to working with glass of two or more colors that would have to be sorted.

Glass particles and micas may be coated with the coatings described herein. Such coated particles may be more robust than those which are currently available, in which the colorants are adsorbed onto the surface (e.g. laked colorants). With the present coating compositions, a broader color palette may be realized and the coated particles are not likely to bleed color. Coated particles of the present invention may find use in graphic arts and the coating compositions may find use in architectural, industrial, plastic, or automotive coatings, and possibly cosmetic applications as well.

The waterborne polyurethane coating compositions of the present invention may be applied to glass substrates with or without hot end coating and/or cold end coating; and with or without a silane pre-treatment of the glass substrates.

The coating compositions of the present invention provide, upon coating, high-performance environmentally-safe vehicles for delivering a component or property to the substrate. For example, the coatings can be used to color or protect glass, such as glass containers and glass particles, through the delivery of a colorant or a protectant to the glass that is included in the coating. Glass is but one example of a substrate that may be coated with the presently described coatings. Other suitable substrates include, but are not limited to, wood, metal, paper, leather, textiles, felt, concrete, masonry, ceramic, stone, plastics, combinations of the materials, and the like.

In a preferred embodiment, the water-based coatings of the present invention are stable as one-pot systems (i.e. single-component or one-component systems). For example, all components of the water-based coatings may remain in a fluid, aqueous, usable state for at least one week, or at least one month, from the time the compositions are formulated (i.e. the components are mixed together). The water-based coatings include a water-dilutable polyurethane dispersion and at least one cross-linking agent. The water-based coatings can also include at least one silane, such as an oxysilane, as an adhesion promoter.

The water-based coatings of the present invention can be cured after being applied to a substrate, such as a glass article. In one embodiment, curing is effected by the addition of heat. Heat curing promotes a thermal cross-linking reaction involving the water-dilutable polyurethane dispersion and the cross-linking agent. In one embodiment, the thermal cross-linking reaction produces a thermoset film.

The water dilutable polyurethane dispersion is typically present in the coating composition in an amount of about 1 wt % to about 99 wt %, based on the total weight of the composition. For example, the polyurethane dispersion may advantageously be present in an amount of about 25 wt % to 95 wt %, or about 50 wt % to about 90 wt %, based on the total weight of the composition. For example, the polyurethane dispersion may be present in an amount of about 1 wt % to about 95 wt %; or about 1 wt % to about 90 wt %; or about 1 wt % to about 85 wt %; or about 1 wt % to about 80 wt %; or about 1 wt % to about 75 wt %; or about 1 wt % to about 70 wt %; or about 1 wt % to about 65 wt %; or about 1 wt % to about 60 wt %; or about 1 wt % to about 55 wt %; or about 1 wt % to about 50 wt %; or about 1 wt % to about 45 wt %; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 99 wt %; or about 5 wt % to about 95 wt %; or about 5 wt % to about 90 wt %; or about 5 wt % to about 85 wt %; or about 5 wt % to about 80 wt %; or about 5 wt % to about 75 wt %; or about 5 wt % to about 70 wt %; or about 5 wt % to about 65 wt %; or about 5 wt % to about 60 wt %; or about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 99 wt %; or about 10 wt % to about 95 wt %; or about 10 wt % to about 90 wt %; or about 10 wt % to about 85 wt %; or about 10 wt % to about 80 wt %; or about 10 wt % to about 75 wt %; or about 10 wt % to about 70 wt %; or about 10 wt % to about 65 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 99 wt %; or about 15 wt % to about 95 wt %; or about 15 wt % to about 90 wt %; or about 15 wt % to about 85 wt %; or about 15 wt % to about 80 wt %; or about 15 wt % to about 75 wt %; or about 15 wt % to about 70 wt %; or about 15 wt % to about 65 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 99 wt %; or about 20 wt % to about 95 wt %; or about 20 wt % to about 90 wt %; or about 20 wt % to about 85 wt %; or about 20 wt % to about 80 wt %; or about 20 wt % to about 75 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 99 wt %; or about 25 wt % to about 95 wt %; or about 25 wt % to about 90 wt %; or about 25 wt % to about 85 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 99 wt %; or about 30 wt % to about 95 wt %; or about 30 wt % to about 90 wt %; or about 30 wt % to about 85 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 99 wt %; or about 35 wt % to about 95 wt %; or about 35 wt % to about 90 wt %; or about 35 wt % to about 85 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 99 wt %; or about 40 wt % to about 95 wt %; or about 40 wt % to about 90 wt %; or about 40 wt % to about 85 wt %; or about 40 wt % to about 80 wt %; or about 40 wt % to about 75 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 99 wt %; or about 45 wt % to about 95 wt %; or about 45 wt % to about 90 wt %; or about 45 wt % to about 85 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 99 wt %; or about 50 wt % to about 95 wt %; or about 50 wt % to about 90 wt %; or about 50 wt % to about 85 wt %; or about 50 wt % to about 80 wt %; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 99 wt %; or about 55 wt % to about 95 wt %; or about 55 wt % to about 90 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 99 wt %; or about 60 wt % to about 95 wt %; or about 60 wt % to about 90 wt %; or about 60 wt % to about 85 wt %; or about 60 wt % to about 80 wt %; or about 60 wt % to about 75 wt %; or about 60 wt % to about 70 wt %; or about 60 wt % to about 65 wt %; or about 65 wt % to about 99 wt %; or about 65 wt % to about 95 wt %; or about 65 wt % to about 90 wt %; or about 65 wt % to about 85 wt %; or about 65 wt % to about 80 wt %; or about 65 wt % to about 75 wt %; or about 65 wt % to about 70 wt %; or about 70 wt % to about 99 wt %; or about 70 wt % to about 95 wt %; or about 70 wt % to about 90 wt %; or about 70 wt % to about 85 wt %; or about 70 wt % to about 80 wt %; or about 70 wt % to about 75 wt %; or about 75 wt % to about 99 wt %; or about 75 wt % to about 95 wt %; or about 75 wt % to about 90 wt %; or about 75 wt % to about 85 wt %; or about 75 wt % to about 80 wt %; or about 80 wt % to about 99 wt %; or about 80 wt % to about 95 wt %; or about 80 wt % to about 90 wt %; or about 80 wt % to about 85 wt %; or about 85 wt % to about 99 wt %; or about 85 wt % to about 95 wt %; or about 85 wt % to about 90 wt %; or about 90 wt % to about 99 wt %; or about 90 wt % to about 95 wt %; or about 95 wt % to about 99 wt %.

The solids content of the polyurethane dispersion is generally about 5 wt % to about 60 wt %, based on the total weight of the polyurethane dispersion. For example, the solids content of the polyurethane dispersion may be about 10 wt % to about 50 wt %, or about 20 wt % to about 40 wt %. For example, the solids content of the polyurethane dispersion may be about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 60 wt %; or about 40 wt % to about 55 wt %; or about 40 wt % to about 50 wt %; or about 40 wt % to about 45 wt %; or about 45 wt % to about 60 wt %; or about 45 wt % to about 55 wt %; or about 45 wt % to about 50 wt %; or about 50 wt % to about 60 wt % or about 50 wt % to about 55 wt %.

Therefore, the amount of polyurethane resin in the coating composition is generally about 0.05 wt % to about 60 wt %, based on the total weight of the coating composition. For example, the amount of polyurethane resin in the coating composition may be about 0.1 wt % to about 50 wt %, or about 0.2 wt % to about 40 wt %. One of ordinary skill in the art can easily calculate the amount of polyurethane resin in the coating composition by multiplying the amount of polyurethane dispersion in the coating composition by the solids content of the polyurethane dispersion (e.g. 99 wt % of dispersion×60% solids content=(99)(0.6)=59.4 wt % of polyurethane resin).

Typically, the water dilutable polyurethane has a molecular weight (MW) of about 5,000 to about 100,000 Daltons. For example, the polyurethane may have a MW of about 10,000 to about 75,000 Daltons, or from about 15,000 to about 50,000 Daltons.

The glass transition temperature (Tg) of the polyurethane is typically in the range of about −40° C. to about 50° C. For example, the Tg of the polyurethane may be in the range of about −30° C. to about 50° C., or in the range of about −20° C. to about 50° C. For example, the Tg of the polyurethane may be in the range of about −40° C. to about 40° C.; or about −30° C. to about 40° C.; or about −30° C. to about 30° C.; or about −20° C. to about 30° C.; or about −20° C. to about 20° C.

The minimum film forming temperature (MFFT) of the water dilutable polyurethane is typically in the range of about −50° C. to about 50° C. For example, the MFFT of the polyurethane may be in the range of about −40° C. to about 40° C., or about −30° C. to about 30° C., or about −20° C. to about 20° C., or in the range of about −10° C. to about 10° C.

The acid number of the polyurethane is generally greater than 20 mg KOH/g, or greater than 25 mg KOH/g, or greater than 30 mg KOH/g. Generally, the sum of the acid number and the hydroxyl number of the polyurethane is greater than 20 mg KOH/g, or greater than 25 mg KOH/g, or greater than 30 mg KOH/g, or greater than 40 mg KOH/g.

The viscosity of the polyurethane dispersion is typically about 5 cP to about 5000 cP. For example, the viscosity of the ink or coating composition may be about 50 cP to about 4000 cP, or about 100 cP to about 2000 cP.

The elongation at break of the polyurethane is typically about 10% to about 250%. For example, the elongation of the polyurethane can be about 20% to about 200%, or about 30% to about 150%.

The tensile strength at break of the polyurethane is typically about 5 MPa to about 150 MPa. For example the tensile strength of the polyurethane may be about 10 MPa to about 100 MPa, or from about 20 MPa to about 50 MPa.

The water dilutable polyurethane resin may comprise a reaction product of: (A) a polyisocyanate component; (B) a polyol component; and (C) an isocyanate-reactive component comprising an ionic group or potentially ionic group. As used herein, the term "polyisocyanate" refers to compounds comprising at least two unreacted isocyanate groups. Polyisocyanates include diisocyanates and diisocyanate reaction products comprising, for example, urethane groups, urea groups, uretodione groups, uretonimine groups, isocyanurate groups, iminooxadiazine dione groups, oxadiazine trione groups, carbodiimide groups, acyl urea groups, biuret groups, and/or allophanate groups.

The repeat unit in the water dilutable carboxyl or hydroxyl functional polyurethane may comprise an aliphatic or cycloaliphatic diisocyanate. Examples of the polyisocyanate component (A) include, but are not limited to, 4,4'-diisocyanatocyclohexylmethane (HMDI); hexamethylene diisocyanate (HDI); 1-methyl-2,4(2,6)-diisocyanatocyclohexane; or 1-isocyanato-3,3,5-trimethyl-5-isocyanatomethyl-cyclohexane (IPDI); and mixtures thereof. Preferably the polyisocyanate component is 4,4'-diisocyanatocyclohexylmethane (HMDI). In addition to the aliphatic or cycloaliphatic diisocyanate, the water-dilutable carboxyl or hydroxyl functional polyurethane dispersion may also contain other polyisocyanates, such as norbornane diisocyanate (NBDI); 2,4- and/or 2,6-diisocyanatotoluene (TDI); 1-methyl-2,4- and/or -2,6-diisocyanatocyclohexane; and 4,4'-diisocyanatodiphenylmethane (MDI); xylylene diisocyanate; tetramethylene diisocyanate; 1,4-diisocyanatobutane; 1,12-diisocyanatododecane; 2,3,3-trimethylhexamethylene diisocyanate; 1,4-cyclohexylene diisocyanate; 4,4'-dicyclohexylmethane diisocyanate; 4,4'-dicyclohexyl diisocyanate; α,α,α',α'-tetramethyl-m- or p-xylylene diisocyanate; triphenylmethane 4,4',4"-triisocyanate; 4-isocyanatomethyl-1,8-octamethylene diisocyanate; mixtures thereof; and the like.

In various non-limiting embodiments, the polyol component (B) may comprise an oligomeric or polymeric compound having terminal and/or pendant hydroxyl groups. Examples of the polyol component include, but are not limited to, polyether polyol, polyester polyol, polyacrylic polyol, polycarbonate polyol, or mixtures thereof, which may comprise diol, triol or tetraol monomers. Examples of diol monomers include tetrahydrofuran; styrene oxide; propylene oxide; ethylene oxide; butylene oxides; epichlorohydrin; ethylene glycol; 1,2 propanediol; 1,3-propanediol; diethylene glycol; 1,4-butanediol; 1,5-pentanediol; 1,6-hexanediol; 1,8-octanediol; neopentyl glycol; 2-methyl-1,3-propanediol; the bis-hydroxymethylcyclohexane isomers; and 2,2-bis-(4-hydroxyphenyl)propane. Examples of triol monomers include trimethylolpropane (TMP), glycerol, and triethanolamine. Preferably, pentaerythritol or tris-(2-hydroxyethyl)isocyanurate (THEIC) is used as a tetraol or triol monomer.

In various non-limiting embodiments, the isocyanate-reactive group (C) may comprise at least one ionic group or potentially ionic group, which may be either cationic or anionic in nature. The isocyanate-reactive component (C) may also comprise at least one isocynanate-reactive group such as a hydroxyl group and/or an amine group. Examples of the isocyanate-reactive group (C) include, but are not limited to, 2,2-bis(hydroxymethyl)-alkanecarboxylic acids (such as dimethylolacetic acid; 2,2-dimethylol-propionic acid; 2,2 dimethylolbutyric acid; or 2,2-dimethylolpentanoic acid), dihydroxysuccinic acid, hydroxypivalic acid and mixtures thereof.

The bases necessary for at least partially neutralizing the carboxyl groups include, but are not limited to, ammonia, N-methylmorpholine, dimethyl-isopropanolamine, triethylamine, dimethylethanolamine, methyldiethanolamine, triethanolamine, morpholine, tripropylamine, ethanolamine, triisopropanolamine, 2-diethylamino-2-methyl-1-propanol and mixtures of these and/or other neutralizing agents. Sodium hydroxide, lithium hydroxide and potassium hydroxide are also suitable, although less preferred, as neutralizing agents.

The cross-linking agents can react with either carboxyl groups, or hydroxyl groups, or both. Examples of suitable cross-linkers include, but are not limited to, blocked polyisocyanates (e.g. API-B1795®, Advanced Polymer, Inc.), in which the isocyanate end group is protected by a blocking group, and is activated upon heating; aminoplast resins (e.g. Cymel® 303 LF, Allnex); and carbodiimides and carbodiimide derivates (e.g. the Carbodilite® series from Nisshinbo Chemical, Inc., and Picassian® series from Stahl Polymers).

In various non-limiting embodiments, the blocked polyisocyanates are soluble or dispersible in water and typically have a blocked isocyanate group content (calculated as NCO, molecular weight=42) of about 1 to 10 wt %, or of about 2 to 8 wt %, based on the supply form. The solids content of the blocked polyisocyanates is generally about 5 to 60 wt %. For example, the solids content of the blocked polyisocyanates can be 10 to 50 wt %, or 20 to 40 wt %. The viscosity of the blocked polyisocyanates is typically about 5 to 5000 cP. For example, the viscosity of the blocked polyisocyanates can be about 50 to 4000 cP, or about 100 to 2000 cP. The blocked polyisocyanates generally have an unblocking temperature of 50° C. to 300° C. For example, the blocked polyisocyanates may have an unblocking temperature of 100-250° C., or 150 to 200° C. The boiling point of the blocking group is typically above 150° C. For example, the boiling point of the blocking group can be above 200° C. Suitable blocking agents are disclosed in "Blocked isocyanates III Part A: Mechanism and Chemistry," Douglas A. Wicks and Zeno W. Wicks Jr., *Progress in Organic Coatings* 36 (1999) 148-172 and "Blocked isocyanates III Part B: Uses and applications of blocked isocyanates," Douglas. A. Wicks and Zeno W. Wicks Jr., *Progress in Organic Coatings* 41 (2001) 1-83.

In various non-limiting embodiments, aminoplast cross-linking components disclosed herein may be selected from the group consisting of urea-based resins and melamine-based resins that are water-dilutable. As used herein, the term "aminoplast resin" refers to resins based on urea-formaldehyde or melamine-formaldehyde condensation products. Suitable aminoplast resins are commercially available from Allnex USA Inc., under the Cymel® trademark. Aminoplast resins comprise functional groups, such as, for example, alkoxymethyl groups, which are reactive with carboxyl or hydroxyl groups at temperatures above ambient temperature. For instance, aminoplast resins comprising alkoxymethyl groups may be used to crosslink and cure polyol resins primarily by trans-esterification reaction between the hydroxyl groups on the polyol resins and the alkoxymethyl groups on the aminoplast resin.

In various non-limiting embodiments, the aminoplast resin of the waterborne polyurethane coating compositions disclosed herein may comprise a urea-based resin comprising a urea-formaldehyde condensation product. Suitable urea-formaldehyde condensation products include, for example, urea-formaldehyde condensates that are non-etherified, partially-etherified, or fully-etherified with monohydric alcohols comprising 1 to 20 carbon atoms.

In various non-limiting embodiments, the aminoplast resin of the waterborne polyurethane coating compositions disclosed herein may comprise a melamine-based resin comprising a melamine-formaldehyde condensation product. Suitable melamine-formaldehyde condensation products include, for example, melamine-formaldehyde condensates that are non-etherified, partially-etherified, or fully-etherified with monohydric alcohols comprising 1 to 20 carbon atoms. The aminoplast resins are generally supplied in liquid form, and may have a solids content of greater than 98%.

In various non-limiting embodiments, the aminoplast resin may comprise monomeric, oligomeric, or polymeric melamine-formaldehyde resins such as, for example, methylated melamines, ethylated melamines, propylated melamines, butylated melamines, and mixed alkylated melamines (e.g., methylated/butylated melamines).

In various non-limiting embodiments, the aminoplast resin may comprise methylol groups, alkoxymethyl groups, or both. An alkoxymethyl group may be of the general formula —$CH_2OR$, where R is a linear, cyclic, or branched alkyl chain having from 1 to 20 carbon atoms.

In various non-limiting embodiments, the aminoplast resin may comprise an oligomeric, methylated, and high-imino group-containing melamine-formaldehyde condensate comprising low methylol content. For example, the aminoplast resin may comprise an oligomeric methylated melamine-formaldehyde condensation product comprising imino groups, methoxymethyl groups, and methylol groups.

In various non-limiting embodiments, the water-dilutable carbodiimide cross-linker has a carbodiimide equivalent weight of about 100 to 800. For example, the carbodiimide cross-linker may have a carbodiimide equivalent weight of 200 to 600, or 300 to 400. The ratio of moles of carbodiimide (—NCN—) groups in the cross-linker to moles of the carboxylic groups (—COOH) in the polyurethane is generally about 0.2:1 to about 1.2:1. For example, the ratio of carbodiimide groups in the cross-linker to the carboxylic groups in the polyurethane may be about 0.4:1 to about 1.0:1, or about 0.6:1 to about 0.8:1. The solids content of the carbodiimide cross-linker is typically about 30 to 60 wt %. For example, the solids content of the carbodiimide cross-linker may be 35 to 55 wt %, or 40 to 50 wt %. The viscosity of the carbodiimide cross-linker is generally about 50 to 500 cP. For example, the viscosity of the carbodiimide may be about 100 to 400 cP, or about 150 to 300 cP. Examples of suitable carbodiimide cross-linkers include, but are not limited to, CARBODILITE® E-05 (Nisshinbo Chemical Inc.) and Picassian® XL-732 (Stahl Polymers).

The cross-linkers are generally available as liquid formulations (e.g. as dispersions or solutions in water or another suitable solvent). The cross-linker liquid formulation is typically present in the coating composition in an amount of about 1 wt % to about 99 wt %, based on the total weight of the composition. For example, the cross-linker liquid formulation may advantageously be present in an amount of about 5 wt % to 75 wt %, or about 10 wt % to about 50 wt %, based on the total weight of the composition. For example, the cross-linker liquid formulation may be present in an amount of about 1 wt % to about 95 wt %; or about 1 wt % to about 90 wt %; or about 1 wt % to about 85 wt %; or about 1 wt % to about 80 wt %; or about 1 wt % to about 75 wt %; or about 1 wt % to about 70 wt %; or about 1 wt % to about 65 wt %; or about 1 wt % to about 60 wt %; or about 1 wt % to about 55 wt %; or about 1 wt % to about 50 wt %; or about 1 wt % to about 45 wt %; or about 1 wt % to about 40 wt %; or about 1 wt % to about 35 wt %; or about 1 wt % to about 30 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 99 wt %; or about 5 wt % to about 95 wt %; or about 5 wt % to about 90 wt %; or about 5 wt % to about 85 wt %; or about 5 wt % to about 80 wt %; or about 5 wt % to about 75 wt %; or about 5 wt % to about 70 wt %; or about 5 wt % to about 65 wt %; or about 5 wt % to about 60 wt %; or about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 99 wt %; or about 10 wt % to about 95 wt %; or about 10 wt % to about 90 wt %; or about 10 wt % to about 85 wt %; or about 10 wt % to about 80 wt %; or about 10 wt % to about 75 wt %; or about 10 wt % to about 70 wt %; or about 10 wt % to about 65 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 99 wt %; or about 15 wt % to about 95 wt %; or about 15 wt % to about 90 wt %; or about 15 wt % to about 85 wt %; or about 15 wt % to about 80 wt %; or about 15 wt % to about 75 wt %; or about 15 wt % to about 70 wt %; or about 15 wt % to about 65 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 99 wt %; or about 20 wt % to about 95 wt %; or about 20 wt % to about 90 wt %; or about 20 wt % to about 85 wt %; or about 20 wt % to about 80 wt %; or about 20 wt % to about 75 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 99 wt %; or about 25 wt % to about 95 wt %; or about 25 wt % to about 90 wt %; or about 25 wt % to about 85 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 99 wt %; or about 30 wt % to about 95 wt %; or about 30 wt % to about 90 wt %; or about 30 wt % to about 85 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 99 wt %; or about 35 wt % to about 95 wt %; or about 35 wt % to about 90 wt %; or about 35 wt % to about 85 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 99 wt %; or about 40 wt % to about 95 wt %; or about 40 wt % to about 90 wt %; or about 40 wt % to about 85 wt %; or about 40 wt % to about 80 wt %; or about 40 wt % to about 75 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 99 wt %; or about 45 wt % to about 95 wt %; or about 45 wt % to about 90 wt %; or about 45 wt % to about 85 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 99 wt %; or about 50 wt % to about 95 wt %; or about 50 wt % to about 90 wt %; or about 50 wt % to about 85 wt %; or about 50 wt % to about 80 wt %; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 99 wt %; or about 55 wt % to about 95 wt %; or about 55 wt % to about 90 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 99 wt %; or about 60 wt % to about 95 wt %; or about 60 wt % to about 90 wt %; or about 60 wt % to about 85 wt %; or about 60 wt % to about 80 wt %; or about 60 wt % to about 75 wt %; or about 60 wt % to about 70 wt %; or about 60 wt % to about 65 wt %; or about 65 wt % to about 99 wt %; or about 65 wt % to about 95 wt %; or about 65 wt % to about 90 wt %; or about 65 wt % to about 85 wt %; or about 65 wt % to about 80 wt %; or about 65 wt % to about 75 wt %; or about 65 wt % to about 70 wt %; or about 70 wt % to about 99 wt %; or about 70 wt % to about 95 wt %; or about 70 wt % to about 90 wt %; or about 70 wt % to about 85 wt %; or about 70 wt % to about 80 wt %; or about 70 wt % to about 75 wt %; or about 75 wt % to about 99 wt %; or about 75 wt % to about 95 wt %; or about 75 wt % to about 90 wt %; or about 75 wt % to about 85 wt %; or about 75 wt % to about 80 wt %; or about 80 wt % to about 99 wt %; or about 80 wt % to about 95 wt %; or about 80 wt % to about 90 wt %; or about 80 wt % to about 85 wt %; or about 85 wt % to about 99 wt %; or about 85 wt % to about 95 wt %; or about 85 wt % to about 90 wt %; or about 90 wt % to about 99 wt %; or about 90 wt % to about 95 wt %; or about 95 wt % to about 99 wt %.

The solids content of the cross-linker liquid formulation is typically about 5 wt % to about 99 wt %. For example, the solids content of the cross-linker liquid formulation may be about 10 wt % to about 50 wt %; or about 20 wt % to about 40 wt %; or about 30 wt % to about 60 wt %; or about 35 wt % to about 55 wt %; or about 40 wt % to about 50 wt %; or about 40 wt % to about 99 wt %. For example, the solids content of the cross-linker liquid formulation may be about 5 wt % to about 95 wt %; or about 5 wt % to about 90 wt %; or about 5 wt % to about 85 wt %; or about 5 wt % to about 90 wt %; or about 5 wt % to about 85 wt %; or about 5 wt % to about 80 wt %; or about 5 wt % to about 75 wt %; or about 5 wt % to about 70 wt %; or about 5 wt % to about 65 wt %; or about 5 wt % to about 60 wt %; or about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 99 wt %; or about 10 wt % to about 95 wt %; or about 10 wt % to about 90 wt %; or about 10 wt % to about 85 wt %; or about 10 wt % to about 80 wt %; or about 10 wt % to about 75 wt %; or about 10 wt % to about 65 wt %; or about 10 wt % to about 60 wt %; or about 10 wt % to about 55 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %; or about 15 wt % to about 99 wt %; or about 15 wt % to about 95 wt %; or about 15 wt % to about 90 wt %; or about 15 wt % to about 85 wt %; or about 15 wt % to about 80 wt %; or about 15 wt % to about 75 wt %; or about 15 wt % to about 70 wt %; or about 15 wt % to about 65 wt %; or about 15 wt % to about 60 wt %; or about 15 wt % to about 55 wt %; or about 15 wt % to about 50 wt %; or about 15 wt % to about 45 wt %; or about 15 wt % to about 40 wt %; or about 15 wt % to about 35 wt %; or about 15 wt % to about 30 wt %; or about 15 wt % to about 25 wt %; or about 15 wt % to about 20 wt %; or about 20 wt % to about 99 wt %; or about 20 wt % to about 95 wt %; or about 20 wt % to about 90 wt %; or about 20 wt % to about 85 wt %; or about 20% wt % to about 80 wt %; or about 20 wt % to about 75 wt %; or about 20 wt % to about 70 wt %; or about 20 wt % to about 65 wt %; or about 20 wt % to about 60 wt %; or about 20 wt % to about 55 wt %; or about 20 wt % to about 50 wt %; or about 20 wt % to about 45 wt %; or about 20 wt % to about 40 wt %; or about 20 wt % to about 35 wt %; or about 20 wt % to about 30 wt %; or about 20 wt % to about 25 wt %; or about 25 wt % to about 99 wt %; or about 25 wt % to about 95 wt %; or about 25 wt % to about 90 wt %; or about 25 wt % to about 85 wt %; or about 25 wt % to about 80 wt %; or about 25 wt % to about 75 wt %; or about 25 wt % to about 70 wt %; or about 25 wt % to about 65 wt %; or about 25 wt % to about 60 wt %; or about 25% wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 99 wt %; or about 30 wt % to about 95 wt %; or about 30 wt % to about 90 wt %; or about 30 wt % to about 85 wt %; or about 30 wt % to about 80 wt %; or about 30 wt % to about 75 wt %; or about 30 wt % to about 70 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 99 wt %; or about 35 wt % to about 95 wt %; or about 35 wt % to about 90 wt %; or about 35 wt % to about 85 wt %; or about 35 wt % to about 80 wt %; or about 35 wt % to about 75 wt %; or about 35 wt % to about 70 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 99 wt %; or about 40 wt % to about 95 wt %; or about 40 wt % to about 90 wt %; or about 40 wt % to about 85 wt %; or about 40 wt % to about 80 wt %; or about 40 wt % to about 75 wt %; or about 40 wt % to about 70 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 99 wt %; or about 45 wt % to about 95 wt %; or about 45 wt % to about 90 wt %; or about 45 wt % to about 85 wt %; or about 45 wt % to about 80 wt %; or about 45 wt % to about 75 wt %; or about 45 wt % to about 70 wt %; or about 45 wt % to about 65 wt %; or about 45 wt % to about 60 wt %; or about 45 wt % to about 55 wt %; or about 45 wt % to about 50 wt %; or about 50 wt % to about 99 wt %; or about 50 wt % to about 95 wt %; or about 50 wt % to about 90 wt %; or about 50 wt % to about 85 wt %; or about 50 wt % to about 80 wt %; or about 50 wt % to about 75 wt %; or about 50 wt % to about 70 wt %; or about 50 wt % to about 65 wt %; or about 50 wt % to about 60 wt %; or about 50 wt % to about 55 wt %; or about 55 wt % to about 99 wt %; or about 55 wt % to about 95 wt %; or about 55 wt % to about 90 wt %; or about 55 wt % to about 85 wt %; or about 55 wt % to about 80 wt %; or about 55 wt % to about 75 wt %; or about 55 wt % to about 70 wt %; or about 55 wt % to about 65 wt %; or about 55 wt % to about 60 wt %; or about 60 wt % to about 99 wt %; or about 60 wt % to about 95 wt %; or about 60 wt % to about 90 wt %; or about 60 wt % to about 85 wt %; or about 60 wt % to about 80 wt %; or about 60 wt % to about 75 wt %; or about 60 wt % to about 70 wt %; or about 60 wt % to about 65 wt %; or about 65 wt % to about 99 wt %; or about 65 wt % to about 95 wt %; or about 65 wt % to about 90 wt %; or about 65 wt % to about 85 wt %; or about 65 wt % to about 80 wt %; or about 65 wt % to about 75 wt %; or about 65 wt % to about 70 wt %; or about 70 wt % to about 99 wt %; or about 70 wt % to about 95 wt %; or about 70 wt % to about 90 wt %; or about 70 wt % to about 85 wt %; or about 70 wt % to about 80 wt %; or about 70 wt % to about 75 wt %; or about 75 wt % to about 99 wt %; or about 75 wt % to about 95 wt %; or about 75 wt % to about 90 wt %; or about 75 wt % to about 85 wt %; or about 75 wt % to about 80 wt %; or about 80 wt % to about 99 wt %; or about 80 wt % to about 95 wt %; or about 80 wt % to about 90 wt %; or about 80 wt % to about 85 wt %; or about 85 wt % to about 99 wt %; or about 85 wt % to about 95 wt %; or about 85 wt % to about 90 wt %; or about 90 wt % to about 99 wt %; or about 90 wt % to about 95 wt %; or about 95 wt % to about 99 wt %.

Therefore, the amount of cross-linker in the coating composition is generally about 0.05 wt % to about 99 wt %, based on the total weight of the coating composition. For example, the amount of cross-linker in the coating composition may be about 0.1 wt % to about 50 wt %, or about 0.2 wt % to about 40 wt %. One of ordinary skill in the art can easily calculate the amount of cross-linker in the coating composition by multiplying the amount of cross-linker liquid formulation in the coating composition by the solids content of the cross-linker liquid formulation (e.g. 99 wt % of liquid formulation×60% solids content=(99)(0.6)=59.4 wt % of cross-linker).

The water-based coating compositions may optionally include a water-dilutable acid-catalyzed silica sol-gel composition. The silica sol-gel composition may be any silica sol-gel composition that is compatible with the functional polyurethane and the cross-linker, and which provides a coating composition which, upon curing, produces a coating with the properties described herein. The aqueous acid-catalyzed silica sol-gel composition may have a solids content of about 1 wt % to about 50 wt %, based on the total weight of the silica sol-gel composition. For example, the silica sol-gel composition may have a solids content of about 10 wt % to about 50 wt %, or about 20 wt % to about 40 wt %, based on the total weight of the silica sol-gel composition.

The water-dilutable acid-catalyzed silica sol-gels may have a pH of about 2 to about 6. For example, the silica sol-gels may have a pH of about 3 to about 5. Such sol-gels are available as commercial products. Examples thereof include, but are not limited to, LUDOX® HSA (GRACE), LUDOX® CL-P (GRACE) and DYNASYLAN® SIVO 110 (Evonik). Alkalinically- and neutrally-stabilized silica sol-gel compositions may also be used.

The waterborne polyurethane coating compositions disclosed herein may further comprise silane-functional adhesion promoters such as, for example, the adhesion promoters disclosed in WO 2017/074918, which is incorporated by reference into this specification. Suitable adhesion promoters include, but are not limited to, (3-mercaptopropyl) trimethoxysilane, (3-aminopropyl)triethoxysilane, (3-glycidyloxypropyl)trimethoxysilane, (3-glycidyloxypropyl) triethoxysilane and mixtures thereof.

Various additives can also be combined with the sol-gel composition to adjust the pH or further improve the chemical and water resistance. Examples of alkaline neutralization agent, hydro- and oleophobic additives include, but are not limited to, Dynasylan SIVO 111 and SIVO 113. Furthermore, silica sols used in the composition may contain not only amorphous, aqueous $SiO_2$ particles but also other sol-gel-forming materials such as oxides, e.g., aluminum oxide, silicon/aluminum oxide, titanium oxide, zirconium oxides, zinc oxide or combinations thereof. In addition to silica-based sol gels, the sol-gel composition may optionally include organofunctional silanes, such as 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane and mixtures thereof.

In order to add color to a substrate, the water-based coating compositions may include one or more colorants. Suitable colorants include but are not limited to organic or inorganic pigments (in various forms, not limited to dry pigment, but may be used as press-cakes or dispersions) and dyes. The dyes include but are not limited to azo dyes, anthraquinone dyes, xanthene dyes, azine dyes, etc., and combinations thereof. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may include but are not limited to: non-limiting pigments such as iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes may be employed. Different kinds of colorants may be mixed in combination to attain the desired colors.

Suitable natural colorants include but are not limited to organic or inorganic pigments and dyes. The natural dyes include but are not limited to henna, madder, spurulina, combinations thereof and the like. Natural organic pigments include but are not limited to cochineal red, chlorophyllin green, carotene yellow, turmeric yellow, anthocyanin blue, etc., and combinations thereof. Natural inorganic pigments include but are not limited to ultramarine blue, vegetable carbon black, combinations thereof and the like. Other natural organic and inorganic pigments and dyes can also be employed, as well as combinations that attain the desired colors.

In one embodiment, the colorants employed in the present invention may be any FD&C or D&C pigment. Preferred FD&C pigments include FD&C Red No. 40, FD&C Yellow No. 5, FD&C Yellow No. 6 and FD&C Blue No. 1, FD&C Blue #1 Aluminum Lake, FD&C Blue #2, FD&C Blue #2 Aluminum Lake on alumina, FD&C Green #3, FD&C Red #3, FD&C Red #40 and its Aluminum Lake, FD&C Yellow #5, FD&C Yellow #5 Aluminum Lake, FD&C Yellow #6, FD&C Lakes, Citrus Red #2, etc. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

In one embodiment, the colorant may be in the form of a colorant dispersion that is resin free (e.g., free of water-based acrylics or styrene acrylics). In another embodiment, the colorant dispersion is resin-free, surfactant based, and/or free of alkyl phenyl ethoxylate (APEO), which is environmentally friendly.

The water-based coating composition may include one or more matting/opacifying agents. Suitable matting/opacifying agents include but are not limited to organic or inorganic particles. The organic particles include but are not limited to ROPAQUE® ULTRA Opaque Polymer (Dow), ROPAQUE® OP-96 All Purpose Pigment (Dow), Deuteron® MK (Deuteron GmbH), Deuteron® MK-F (Deuteron GmbH), Deuteron® PMH C (Deuteron GmbH), Deuteron® MM 684 (Deuteron GmbH), SOOFINE® JJ Powder® (J Color Chemicals), SOOFINE® JMV Microsphere (J Color Chemicals), SOOFINE® MV Micron-Beads (J Color Chemicals), combinations thereof and the like. The inorganic particles include but are not limited to KRONOS® 4311 (KRONOS), TiONA® 595 (Cristal), ACEMATT® 82 (Evonik), ACEMATT® HK 440 (Evonik), ACEMATT® OK 412 (Evonik), ACEMATT® 3600 (Evonik), Mistron® Monomix G (Imerys), Jetfine® 1H (Imerys), Syloid® 161 (Grace), Syloid® 308 (Grace), etc., and combinations thereof. Other organic and inorganic particles can also be employed, as well as combinations that achieve the surface effect desired.

Colorants, if present, may be included in the water-based coatings in amounts of about 0.5 wt % to about 50 wt %. For example, colorants may be included in an amount of about 1 wt % to about 40 wt %, or about 5 wt % to about 30 wt %, and may be in the form of pigment dispersions or matting/opacifying agents. Water-dilutable acid-catalyzed silica sol-gel compositions, if included, may be present in the water-based coatings in amounts of about 0.1 wt % to about 20 wt %. For example, silica sol-gel compositions may be present in an amount of about 1 wt % to about 15 wt %, or about 2 wt % to about 10 wt %. Organic solvents, if included, may be present in the water-based coatings in amounts of about 0.1 wt % to about 15 wt %. For example, organic solvents may be present in amounts of about 0.5 wt % to about 10 wt %, or about 1 wt % to about 5 wt %. In certain embodiments, there are no organic solvents in the coating compositions of the present invention. All values are based on the total formulation weight. In the case of clear, non-colored glass, colorants are not needed.

Other optional additives can be included in the water-based coating compositions, such as defoamers, wetting agents, leveling agents, dispersants, surfactants, plasticizers, rheology modifiers, amine stabilizers, antimicrobials, photocatalysts, ultraviolet absorbers, antioxidants and combinations thereof. The amount of each additive may independently be between about 0.05 wt % to 5 wt %, based on the weight of the total formulation of the water-based coatings.

The present water-based coatings can be prepared by a number of processes, resulting in stable coating compositions with long shelf life. Upon application and curing of the present water-based coatings, a coated substrate, e.g., a coated glass substrate, is produced that has desirable properties. For example, a water-dilutable carboxyl or hydroxyl functional polyurethane dispersion and cross-linking agent (e.g. carbodiimide) can be added to a pigment dispersion in sequence and mixed for a period of time, resulting in a pigment-including water-based coating that has stability over at least a month. When applied to glass and then cured, such coating compositions color the glass while being substantially transparent, and meet all chemical and physical requirements for glass coatings.

The water-based coating compositions generally contain, at most, about 15 wt % VOCs. However, as indicated, the amount of VOCs in the compositions may be far less than that. For example, the compositions may contain, less than about 10 wt % VOCs, or at most about 5 wt % VOCs. In certain embodiments, the coatings may be essentially free of VOCs (e.g., VOCs present in trace amounts). VOCs can be environmentally harmful and present a health hazard.

The compositions of the present disclosure can be applied by conventional methods, such as spray coating, dip coating, flow coating, spin coating, curtain coating, roll coating, etc. to form a continuous surface film. Decorative coatings providing protective properties can be obtained by heat curing at a temperature in the range of 50° C. to 300° C., or 100° C. to 250° C., or 150° C. to 200° C., for from about 5 min to 12 hr. The coating thickness can be varied by means of the application technique. Coatings having a thickness of 0.5 µm to 20 µm, and more desirably of 1 µm to 10 µm, are generally utilized.

EXAMPLES

The following examples illustrate specific aspects of the present invention and are not intended to limit the scope thereof in any respect and should not be so construed. The following examples illustrate specific aspects of the present water-based coating compositions. The examples are merely exemplary and are not to be construed as limiting the scope of subject matter claimed on the basis of the present disclosure. All parts and percentages are by weight (wt % or mass % based on the total weight).

For example, in the examples that follow, a substrate is spray-coated with the water-based coating compositions, yet it is possible to apply the water-based coatings by other methods. The person of ordinary skill in the art would be able to adjust the water-based coating compositions for viscosity, rheology, etc., to adapt them (if necessary) for application by another method, such as dip coating, flow coating, spin coating, curtain coating and roll coating.

Prior to spray, 2% to 3% of the adhesion promoter (Silquest® A-187, Momentive Performance Materials, USA) was added to certain of the examples below and well mixed. The sprayed samples were cured by baking at 175° F. (about 80° C.) for 30 min. All the resistance properties were measured after the samples cooled down to room temperature naturally.

All of the ensuing Examples are essentially solvent-free (0% VOC) coatings, leaving only the possibility of trace amounts of VOC's.

Test Methods

Application of Ink or Coating to a Substrate

The coatings were applied to glass bottles using a central pneumatic 4 oz. adjustable detail air spray gun. Pressure was set at 30 psi, container rotation was 250-270 rpm, spray distance was 4-6 inches, and spray cycle was 4-8 seconds. Coatings were heat cured at 175° C. for 30 minutes, followed by cooling down naturally (i.e. ambient conditions), before any testing.

Transparency

Transparency of the cured coatings was assessed by visual inspection, and rated on a 1 to 5 scale, with 1 being very hazy, and 5 being clear. A score of 4 or higher is desirable for coatings designed to be transparent.

Resistance and Adhesion Rating Scale

Solvent resistance, water resistance, and adhesion were rated on a 5 point scale (of the amount of coating removed from the substrate), wherein:
1=poor (total removal)
2=fair/poor (significant removal)
3=fair (moderate removal)
4=good (slight removal)
5=excellent (no removal)
For all tests, a score of 4 or higher is desirable.

Solvent Resistance

Resistance to removal by solvents was tested using acetone and cologne (Brut cologne for men). A cotton ball was soaked with solvent (either acetone or cologne). The cotton ball was rubbed back and forth on the surface of the coating 100 times. The color transferred to the cotton ball qualitatively indicated the removal amount of the coating during the test. The resistance was rated on a scale of 1 to 5, as described above.

Bottle Rub Resistance

The bottle rub resistance is an indicator of resistance of the coating to removal by friction. Bottle rub resistance was tested by rubbing the surfaces of two coated containers together, one container in each hand. This test was repeated several times at various locations on the containers. Instances of scratching or sliding resistance were recorded. Bottle rub resistance was assessed on a scale of 1 to 5, as described above.

Adhesion

Adhesion was tested by the cross-hatch tape adhesion test, using a BYK-Gardner 5126 Cross-Cut Tester. First, a lattice pattern of 1 mm cutting space was made on the coating (cutting to the glass substrate). Then, 3M 616 tape was placed on the coating covering the cut pattern, and pulled back slowly on itself at about 180° angle. The amount of coating removed from the substrate to the tape was rated on a scale of 1 to 5, as described above.

Pencil Hardness

The pencil hardness of the coatings was measured using a BYK-Gardner PH-9500 Pencil Hardness Tester. Pencils of different hardness were moved with a fixed pressure and a fixed angle over the coating. The hardness of the pencil that scratched through the coating was recorded. The hardness of a pencil is rated on the following scale, from the softest (6B) to the hardest (9H): 6B<5B<4B<3B<2B<B<HB<F<H<2H<3H<4H<5H<6H<7H<8H<9H.

Water Resistance

The water resistance of the cured coating was tested by immersing the coated glass bottle in 0° C. water for 48 hours, and immersing the coated glass bottle in 25° C. water for 48 hours, respectively. This was followed by the cross-hatch tape adhesion test after each immersion (i.e. after the 0° C. immersion, then after the 25° C. immersion), and the reported value for adhesion is the average of the two tests. The amount of coating removed from the substrate to the tape was rated on a scale of 1 to 5, as described above.

Dishwashing Resistance

Dishwashing resistance was tested generally following standard BS EN 12875-1:2005 procedures. However, because of equipment limitations, some minor modifications were required. The dishwasher used in the test was Kenmore 14659 18" Portable Dishwasher, selecting normal wash cycle, using the high temperature option, and Cascade Platinum Dishwasher Detergent. Each wash cycle included two washes at approximately 140° F. (60° C.) and 4 rinses. The total time for each wash cycle was about 95 min. After each wash cycle, the coating was inspected for defects, anomalies, and other changes in the coating. The number of dishwashing cycles in which the coating remained intact was recorded.

Polyurethane Dispersions

Table 1 describes the repeat units and the properties of the polyurethane dispersions used in the examples below.

TABLE 1

Polyurethane dispersions

| | PUD-1 | PUD-2 | PUD-3 | PUD-4 | PUD-5 | PUD-6 | PUD-7 | PUD-8 |
|---|---|---|---|---|---|---|---|---|
| Polyiso-cyanate Unit | IPDI | IPDI | HMDI & IPDI | TDI | TDI | HMDI | HMDI & IPDI | HMDI & IPDI |
| Polyol Unit* | A | B | B | B | B | C | B | B |
| Solids content (%) | 35-38 | 22-23 | 31-33 | 22-24 | 19-21 | 34-36 | 34-36 | 34-36 |
| Viscosity (cP) | 700-1,100 | 5-100 | 50-500 | 5-300 | 5-1000 | 5-400 | 20-200 | 5-300 |
| Mw | 10,000-15,000 | 30,000-40,000 | 7,000-8,000 | 50,000-60,000 | >100,000 | 9,000-10,000 | 6,000-7,000 | |
| Tg (° C.) | −18 | 49 | −1 | 7 | 70 | −24 | −22 | −34 |
| MFFT (° C.) | | | 0 | | | 40-45 | 35 | 2-5 |
| Acid Number (mg KOH/g) | 42 | 25 | 36 | 26 | 25 | 17 | 18 | 11 |
| Hydroxyl Number (mg KOH/g) | 0 | 0 | 95 | 0 | 0 | 0 | 0 | 0 |
| Elongation (%) | | 30 | | 550 | <10 | 120-220 | | 250-400 |
| Tensile Strength (MPa) | | 22 | | 46 | 32 | 25-45 | | 30-50 |

*Polyol unit:
A = polyether
B = polyester
C = polycarbonate
Polyurethane dispersions:
PUD-1 is SUN 940-1207 (Sun Chemical, US)
PUD-3 is Alberdingk ® DUR 95 (Alberdingk Boley, USA)
PUD-6 is ESACOTE ® PU 70 (Lamberti S.p.A., Italy)
PUD-7 is Alberdingk ® UC 80 (Alberdingk Boley, USA)
PUD-8 is ESACOTE ® PU 44 (Lamberti S.p.A., Italy)

Examples 1 to 3

Preparation of Examples 1 to 3

In Example 1, the water-dilutable polyurethane dispersion PUD-1 was mixed with the carbodiimide cross-linker CARBODILITE® V-04 (Nisshinbo Chemical Inc., Japan), followed by various additives and pigment dispersion. The resulting mixture was agitated using a mechanical mixer until a homogeneous mixture was obtained. The mixture was deaerated and stored overnight before use.

Example 2 was prepared similarly to Example 1, except that a different water-dilutable polyurethane dispersion, PUD-2, and cross-linker, CARBODILITE® E-05 (Nisshinbo Chemical Inc., Japan) were used.

In Example 3, the water-dilutable polyurethane dispersion PUD-1 was first mixed with the deaerator (Airase 8070, BYK USA Inc., USA), followed by the $TiO_2$ slurry (Sunsperse White 6, Sun Chemical Corporation, USA). After the mixture became homogeneous, the carbodiimide crosslinker CARBODILITE® E-05 and various additives were then added under continuous stirring. The mixture was deaerated and stored overnight before use.

TABLE 2

Formulations of Examples 1 to 3

| Components | Description | Ex. 1 | Ex. 2 | Ex. 3 |
|---|---|---|---|---|
| PUD-1 | Polyurethane dispersion | 68.09 | | 59.50 |
| PUD-2 | Polyurethane dispersion | | 81.46 | |
| Carbodilite E-05 | Carbodiimide cross-linker | | 6.32 | 7.90 |
| Carbodilite V-04 | Carbodiimide cross-linker | 6.22 | | |
| Rheolate 299 | Rheology modifier | 0.33 | 0.40 | 0.20 |
| BYK-378 | Leveling agent | 0.12 | 0.14 | 0.10 |
| BYK-381 | Wetting agent | | | 0.40 |
| TBEP | Surfactant | 0.78 | 0.94 | 0.80 |
| Foamex 822 | Defoamer | 0.59 | 0.70 | 0.40 |
| Airase 8070 | Deaerator | | | 0.30 |
| Triethanolamine | Neutralization agent | 0.79 | 0.94 | |
| Water | Diluent | 15.39 | | 3.90 |
| Sunsperse Red 122 | Pigment dispersion | 7.69 | 9.10 | |
| Sunsperse White 6 | $TiO_2$ slurry | | | 26.50 |
| TOTAL | | 100.00 | 100.00 | 100.00 |
| | —NCN—/—COOH | 0.4 | 1.0 | 0.6 |
| | Solids content (%) | 30 | 24 | 43 |
| | Fresh Viscosity (cP) | 41 | 83 | 100 |
| | Aged Viscosity (cP)[1] | 105 | 64 | 83 |

[1]Aging conditions: 10 days at 50° C.

Examples 4 to 6

Preparation of Examples 4 to 6

The formulations of Examples 4 to 6 are shown in Table 3. Examples 4 and 5 have the same polyurethane dispersion, PUD-1, as Examples 1 and 3, but comprise a melamine cross-linker (Cymel® 303 LF, Allnex, USA), and a blocked polyisocyanate cross-linker (AP-BI795®, Advanced Polymer Inc., USA), respectively. Example 6 was prepared with PUD-3, and a melamine cross-linker.

TABLE 3

Formulations of Examples 4 to 6

| Components | Description | Ex. 4 | Ex. 5 | Ex. 6 |
|---|---|---|---|---|
| PUD-1 | Polyurethane dispersion | 60.05 | 65.85 | |
| PUD-3 | Polyurethane dispersion | | | 77.40 |
| Cymel 303 LF | Melamine cross-linker | 10.31 | | 8.60 |
| API-BI795 | Blocked polyisocyanate | | 13.90 | |
| Surfynol 110D | Defoamer | | 0.72 | |

TABLE 3-continued

Formulations of Examples 4 to 6

| Components | Description | Ex. 4 | Ex. 5 | Ex. 6 |
|---|---|---|---|---|
| Rhodoline 679 | Defoamer | | 0.72 | |
| Airase 5700 | Defoamer | | | 0.50 |
| BYK-348 | Wetting agent | 0.52 | 0.52 | 0.50 |
| BYK-378 | Leveling agent | 0.15 | | 0.15 |
| TBEP | Surfactant | 0.21 | | 0.75 |
| DI Water | Diluent | 22.68 | 11.28 | 11.90 |
| Rheolate 299 | Rheology modifier | 0.21 | | 0.20 |
| SunSperse Red 122 | Pigment dispersion | 5.15 | 7.73 | |
| TOTAL | | 100.00 | 100.00 | 100.00 |
| | Solids content (%) | 31 | 29 | 33 |
| | Fresh Viscosity (cP) | 61 | 24 | 49 |
| | Aged Viscosity (cP)[1] | Gelled | 26 | 27 |

[1]Aging conditions: 10 days at 50° C.

Example 4 exhibited reduced stability (i.e. gelled after aging at 50° C. for 10 days), and slightly less transparency (shown in Table 9). Example 5 showed good stability, but its dishwasher resistance (i.e. resistance to hot, alkaline washing media) was reduced (shown in Table 9). Example 5 coating failed at the 8th cycle. Usually, greater than 100 dishwasher cycles are needed for glass coating application.

Examples 7 to 9

Preparation of Comparative Examples 7 to 9

Comparative Examples 7 to 9 were prepared in a similar manner to Examples 1 to 6. The formulations of Examples 7 to 9 are shown in Table 4.

TABLE 4

Formulation of Examples 7 to 9

| Components | Description | Ex. 7 | Ex. 8 | Ex. 9 |
|---|---|---|---|---|
| PUD-4 | Polyurethane dispersion | 89.50 | | |
| PUD-5 | Polyurethane dispersion | | 90.40 | |
| PUD 6 | Polyurethane dispersion | | | 61.86 |
| Carbodilite E-05 | Carbodiimide cross-linker | 7.07 | 6.14 | |
| API-BI795 | Blocked polyisocyanate | | | 13.47 |
| Rheolate 299 | Rheology modifier | 0.43 | 0.44 | |
| BYK-348 | Wetting agent | | | 0.52 |
| BYK-378 | Leveling agent | 0.16 | 0.16 | |
| Dynasylan SIVO 110 | Silica sol-gel | | | 2.26 |
| Dynasylan SIVO 111 | Hydrophobizing additive | | | 0.03 |
| TBEP | Surfactant | 1.03 | 1.04 | |
| Foamex 822 | Defoamer | 0.78 | 0.78 | |
| Rhodoline 679 | Defoamer | | | 0.72 |
| Triethanolamine | Neutralization agent | 1.03 | 1.04 | |
| DI Water | Diluent | | | 13.41 |
| SunSperse Red 122 | Pigment dispersion | | | 7.73 |
| TOTAL | | 100.00 | 100.00 | 100.00 |
| | —NCN—/—COOH | 1.0 | 1.0 | N/A |
| | Solids content (%) | 19 | 17 | 28 |
| | Fresh Viscosity (cP) | 75 | 30 | <50 |
| | Aged Viscosity (cP)[1] | 56 | 38 | <50 |

[1]Aging conditions: 10 days at 50° C.

The elongation of PUD-4 in Example 7 is about 550%, while the elongation of PUD-5 in Example 8 is less than 10%. The Tg of PUD-5 is 70° C. Also, the acid number of PUD-6 in Example 9 is only 17. As a result, Example 7 failed in the acetone rub resistance test; Example 8 failed in both the acetone rub resistance and the water resistance test; Example 9 failed in both the acetone and cologne resistance tests. In addition, the pencil hardness of Example 9 is significantly lower than other examples. Furthermore, Examples 8 and 9 showed more haziness, which is usually undesirable by the glass industry. Thus, Comparative Examples 7 to 9 show that to provide improved coatings, a PUD must have all of the claimed properties.

Examples 10 to 13

Preparation of Examples 10 to 13

Additional Examples 10 to 13 were prepared in a similar manner. The formulations of Examples 10 to 13 are shown in Tables 5 to 7.

Examples 10 and 11 are water-based coating compositions that include colorants, and are transparent when applied to a glass substrate.

In Example 10 (Table 5), a carboxyl-functional polyurethane dispersion, PUD-1, was mixed with the blocked polyisocyanate (API-BI795, Advanced Polymer, Inc., USA). The water-dilutable acid catalyzed silica sol-gel and hydrophobizing additive were added with continuous stirring, followed by other additives. After addition of pigment dispersion and water, the adhesion promoter (Silquest® A-189, Momentive Performance Materials, USA) was added in the end while mixing. The resulting mixture was agitated using a mechanical mixer until a homogeneous mixture was obtained.

Example 11 (Table 5) was prepared in a similar manner to Example 10, except that a water-dilutable hydroxyl-functional polyurethane dispersion, PUD-3, was used, and the coating comprises no silica sol-gel, hydrophobizing additive, or adhesion promoter. An aminoplast resin (Cymel® 303 LF, Allnex, USA) was used as the cross-linking agent.

TABLE 5

Formulations of Examples 10 and 11

| Components | Description | Ex. 10 | Ex. 11 |
|---|---|---|---|
| PUD-1 | Carboxyl functional polyurethane dispersion | 60.00 | |
| PUD-3 | Hydroxyl functional polyurethane dispersion | | 68.92 |
| Rhodoline 679 | Defoamer | 0.70 | |
| Surfynol 110D | Defoamer | | 0.63 |
| API-BI795 | Blocked polyisocyante | 13.07 | |
| Cymel 303 LF | Aminoplast resin | | 7.70 |
| BYK-348 | Wetting agent | 0.50 | 0.45 |
| BYK-378 | Leveling agent | | 0.09 |
| Dynasylan SIVO 110 | Silica sol-gel | 2.19 | |
| Dynasylan SIVO 111 | Hydrophobizing additive | 0.03 | |
| Tris(2-butoxyethyl)phosphate | Surfactant | | 0.89 |
| Rheolate 299 | Rheology modifier | | 0.17 |
| Deionized Water | Diluent | 13.01 | 10.65 |
| SunSperse Red 122 | Pigment dispersion | 7.50 | 7.50 |
| Silquest A-187 | Silane adhesion promoter | 3.00 | 3.00 |
| TOTAL | | 100 | 100 |
| | Solids content (%) | 31 | 34 |
| | Viscosity (cP) | 20 | 50 |

In Example 12 (Table 6), the titanium dioxide slurry (KRONOS® 4311, KRONOS, Inc., USA) was added gradually into the water-dilutable hydroxyl functional polyurethane dispersion PUD-3 with continuous mixing. Mixing continued until the pigment was fully dispersed. The cross-linking agent, additives, and adhesion promoter were added and mixing continued. Deionized water was added to adjust the viscosity. Example 12 is an opaque white coating.

TABLE 6

Formulation of Example 12

| Components | Description | Ex. 12 |
|---|---|---|
| PUD-3 | Hydroxyl functional polyurethane dispersion | 58.30 |
| KRONOS 4311 | Titanium dioxide slurry | 19.00 |
| Surfynol 110D | Defoamer | 0.70 |
| Cymel 303 LF | Aminoplast resin | 6.40 |
| BYK-348 | Wetting agent | 0.50 |
| BYK-378 | Leveling agent | 0.15 |
| Tris(2-butoxyethyl)phosphate | Surfactant | 0.75 |
| Rheolate 299 | Rheology modifier | 0.20 |
| DI Water | Diluent | 11.00 |
| Silquest A-187 | Silane adhesion promoter | 3.00 |
| TOTAL | | 100.00 |
| | Solids content (%) | 43 |
| | Viscosity (cP) | 30 |

Example 13 (Table 7) is a frost coating. The two matting agents were gradually added into the water-dilutable hydroxyl functional polyurethane dispersion PUD-3 while mixing, followed by the cross-linking agent, additives, and adhesion promoter. Deionized water was added to adjust the viscosity to meet the spray requirements.

TABLE 7

Formulation of Example 13

| Components | Description | Ex. 13 |
|---|---|---|
| PUD-3 | Hydroxyl functional polyurethane dispersion | 65.35 |
| Surfynol 110D | Defoamer | 0.59 |
| Cymel 303 LF | Aminoplast resin | 7.29 |
| BYK-348 | Wetting agent | 0.43 |
| BYK-378 | Leveling agent | 0.09 |
| Tris(2-butoxyethyl)phosphate | Surfactant | 0.85 |
| RHEOLATE 299 | Rheology modifier | 0.17 |
| DI Water | Diluent | 10.10 |
| Mistron Monomix | Matting agent | 10.09 |
| ACEMATT OK-412 | Matting agent | 2.04 |
| Silquest A-187 | Silane adhesion promoter | 3.00 |
| TOTAL | | 100 |
| | Solids content (%) | 43 |
| | Viscosity (cP) | 70 |

Examples 10 to 13 were tested as described above. The results are shown in Table 10.

Example 14 to 16

Preparation of Comparative Examples 14 to 16

Comparative Examples 14 to 16 were prepared in a similar manner to Example 10, except for containing three different water-dilutable carboxyl functional polyurethane dispersions. The formulations of Examples 14 to 16 are shown in Table 8.

TABLE 8

Formulations of comparative Examples 14 to 16

| Components | Description | Ex. 14 | Ex. 15 | Ex. 16 |
|---|---|---|---|---|
| PUD-7 | Carboxyl functional polyurethane dispersion | 60.00 | | |
| PUD-8 | Carboxyl functional polyurethane dispersion | | 60.00 | |
| PUD-6 | Carboxyl functional polyurethane dispersion | | | 60.00 |
| Rhodoline 679 | Defoamer | 0.70 | 0.70 | 0.70 |
| API-BI795 | Blocked polyisocyante | 13.07 | 13.07 | 13.07 |
| BYK-348 | Wetting agent | 0.50 | 0.50 | 0.50 |
| Dynasylan SIVO 110 | Silica sol-gel | 2.19 | 2.19 | 2.19 |
| Dynasylan SIVO 111 | Hydrophobizing additive | 0.03 | 0.03 | 0.03 |
| DI Water | Diluent | 13.01 | 13.01 | 13.01 |
| SunSperse Red 122 | Pigment dispersion | 7.50 | 7.50 | 7.50 |
| Silquest A-187 | Adhesion promoter | 3.00 | 3.00 | 3.00 |
| TOTAL | | 100 | 100 | 100 |

The polyurethane dispersion used in Example 15, PUD-8, has an acid number lower than 20. The polyurethane dispersion used in Example 14 (PUD-7) and Example 16 (PUD-6) have acid numbers lower than 20, and MFFT higher than 30° C.

Example 17

Assessment of Examples 1 to 9

The properties of Examples 1 to 6, and comparative Examples 7 to 9 were assessed as described above. The data are shown in Table 9.

TABLE 9

Test results for Examples 1 to 9

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Transparency | 5 | 5 | N/A | 4 | 5 | 5 | 5 | 4 | 3 |
| Acetone Rub Resistance | 5 | 5 | 5 | 5 | 3 | 5 | 2 | 2 | 3 |
| Cologne Rub Resistance | 5 | 5 | 5 | 5 | 3 | 5 | 5 | 5 | 3 |
| Bottle Rub Resistance | 5 | 5 | 5 | 5 | 5 | 5 | 5 | 5 | 5 |
| Cross-hatch Tape Adhesion | 5 | 5 | 5 | 5 | 5 | 5 | 5 | 5 | 5 |
| Pencil Hardness | 7H | 7H | 7H | 7H | 6H | 7H | 7H | 7H | 4H |
| Water Resistance | 5 | 5 | 5 | 5 | 5 | 5 | 4 | 2 | 5 |
| Dishwashing Cycles | >100 | >100 | >100 | >100 | <10 | >100 | >100 | <50 | N/A |

For colors except for white, black and frost, a clearer coating is more desirable by the glass decoration industry. Example 3 is a white coating, and therefore its transparency was not assessed. Examples 1 to 4 and 6, all falling within the scope of the present invention, show superior performance in all of the properties tested. It can also be seen that, of the cross-linkers used, carbodiimide cross-linkers are preferred, as Example 5, using a blocked polyisocyanate cross-linker, failed some of the tests. Moreover, comparative Examples 7 to 9, each having at least one parameter outside of the scope of the invention, fail on one or more of the tests.

Example 18

Assessment of Examples 10 to 16

Examples 10 to 13 and Comparative Examples 14 to 16 were tested as described above. The test results are shown in Table 10.

TABLE 10

Test results for Examples 10 to 16

| | Ex. 10 | Ex. 11 | Ex. 12 | Ex. 13 | Ex. 14 | Ex. 15 | Ex. 16 |
|---|---|---|---|---|---|---|---|
| Transparency | 5 | 5 | N/A | N/A | 3 | 5 | 3 |
| Acetone Rub Resistance | 5 | 5 | 5 | 5 | 5 | 3 | 3 |
| Cologne Rub Resistance | 5 | 5 | 5 | 5 | 5 | 3 | 3 |
| Bottle Rub Resistance | 5 | 5 | 5 | 5 | 5 | 5 | 5 |
| Cross-hatch Tape Adhesion | 5 | 5 | 5 | 5 | 5 | 5 | 5 |
| Pencil Hardness | 7H | 7H | 7H | 7H | 7H | 4H | 4H |
| Water Resistance | 5 | 5 | 5 | 5 | 5 | 5 | 5 |
| Dishwashing Cycles | >100 | >100 | >100 | >100 | >100 | N/A | N/A |

The transparency of Examples 10 and 11 is superior to the transparency of comparative Example 14. Example 12 is an opaque coating, and Example 13 is a frost coating, and therefore their transparency was not assessed. The properties of Examples 10 to 13 exceed or equal the properties of comparative Examples 14 to 16. Notably, the acetone rub resistance and cologne rub resistance of Examples 10 to 13 exceeds that of comparative Examples 15 and 16.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A coating composition comprising:
   a) a water dilutable carboxyl, or hydroxyl, or carboxyl and hydroxyl, functional polyurethane dispersion, in an amount of 1 wt % to 99 wt %, based on the total weight of the coating composition; and
   b) one or more cross-linking agents, in an amount of 1 wt % to 99 wt %, based on the total weight of the coating composition;

wherein the one or more cross-linking agents are selected from the group consisting of carbodiimides, carbodiimide derivatives, aminoplasts, blocked isocyanates, and combinations thereof;
   wherein the polyurethane has a glass transition temperature of −40° C. to 50° C.;
   wherein the polyurethane has an elongation at break of 10% to 250%;
   wherein the acid number of the polyurethane is greater than 20 mg KOH/g;

wherein at least one crosslinker is a carbodiimide or carbodiimide derivative;
wherein the moles of carbodiimide (—NCN—) groups in the carbodiimide crosslinker to the moles of carboxylic (—COOH) groups in the polyurethane is 0.2:1 to 1.2:1;
and wherein when the coating composition is applied to a substrate and dried and/or cured, the dried and cured coating has a pencil hardness of equal to or greater than 6H.

2. The coating composition of claim 1, wherein the polyurethane dispersion is present in an amount of 25 wt % to 95 wt %, based on the total weight of the coating composition.

3. The coating composition of claim 1, wherein the one or more cross-linking agents are present in an amount of 5 wt % to 75 wt %, based on the total weight of the coating composition.

4. The coating composition of claim 1, wherein the polyurethane dispersion has a solids content of 5 wt % to 60 wt %, based on the total weight of the polyurethane dispersion.

5. The coating composition of claim 1, wherein the viscosity of the polyurethane dispersion is 5 cP to 5000 cP.

6. The coating of claim 1, wherein the glass transition temperature of the polyurethane is −40° C. to 50° C.

7. The coating composition of claim 1, wherein the minimum film forming temperature of the polyurethane is −40° C. to 40° C.

8. The coating composition of claim 1, wherein the acid number of the polyurethane is greater than 25 mg KOH/g.

9. The coating composition of claim 1, wherein the sum of the acid number and hydroxyl number of the polyurethane is greater than 20 mg KOH/g.

10. The coating composition of claim 1, wherein the polyurethane comprises an aliphatic or cycloaliphatic diisocyanate repeat unit.

11. The coating composition of claim 1, further comprising one or more silane, oxysilane, or combinations thereof, adhesion promoters.

12. The coating composition of claim 1, having a volatile organic compound content of less than 10 wt %, based on the total weight of the coating composition.

13. The coating composition of claim 1, wherein the tensile strength of the polyurethane is 5 MPa to 150 MPa.

14. The coating composition of claim 1, wherein the elongation of the polyurethane is 20% to 200%.

15. A method of applying a coating composition on a substrate, comprising:
a) providing the coating composition of claim 1;
b) applying the coating composition to the substrate; and
c) drying and/or curing the composition on the substrate.

16. The method of claim 15, wherein step b) is carried out using a method selected from the group consisting of spray coating, dip coating, flow coating, spin coating, curtain coating, and roll coating.

17. The method of claim 15, wherein the substrate is selected from the group consisting of glass, wood, metal, paper, leather, textiles, felt, concrete, masonry, ceramic, stone, plastics, combinations of the and materials.

18. A substrate or an article comprising the coating composition of claim 1.

19. A method of formulating a coating composition, comprising mixing:
a) a water dilutable carboxyl, or hydroxyl, or carboxyl and hydroxyl, functional polyurethane dispersion, in an amount of 1 wt % to 99 wt %, based on the total weight of the coating composition; and
b) one or more cross-linking agents, in an amount of 1 wt % to 99 wt %, based on the total weight of the coating composition;
wherein the one or more cross-linking agents are selected from the group consisting of carbodiimides, carbodiimide derivatives, aminoplasts, blocked isocyanates, and combinations thereof;
wherein the polyurethane has a glass transition temperature of −40° C. to 50° C.; and
wherein the polyurethane has an elongation at break of 10% to 250%; and
wherein the acid number of the polyurethane is greater than 20 mg KOH/g;
wherein at least one crosslinker is a carbodiimide or carbodiimide derivative; and
wherein the moles of carbodiimide (—NCN—) groups in the carbodiimide crosslinker to the moles of carboxylic (—COOH) groups in the polyurethane is 0.2:1 to 1.2:1,
and wherein when the coating composition is applied to a substrate and dried and/or cured, the dried and cured coating has a pencil hardness of equal or greater than 6H.

20. The method of claim 15, wherein the dried and cured coating has a pencil hardness of equal or greater than 6H; and/or a dishwashing resistance of equal to or greater than 50 dishwashing cycles.

21. The coating composition of claim 1, wherein the polyurethane has an elongation at break of 10% to 75%.

* * * * *